Oct. 2, 1951     A. I. APPLETON     2,569,914
COVER CLAMP
Filed Aug. 6, 1948
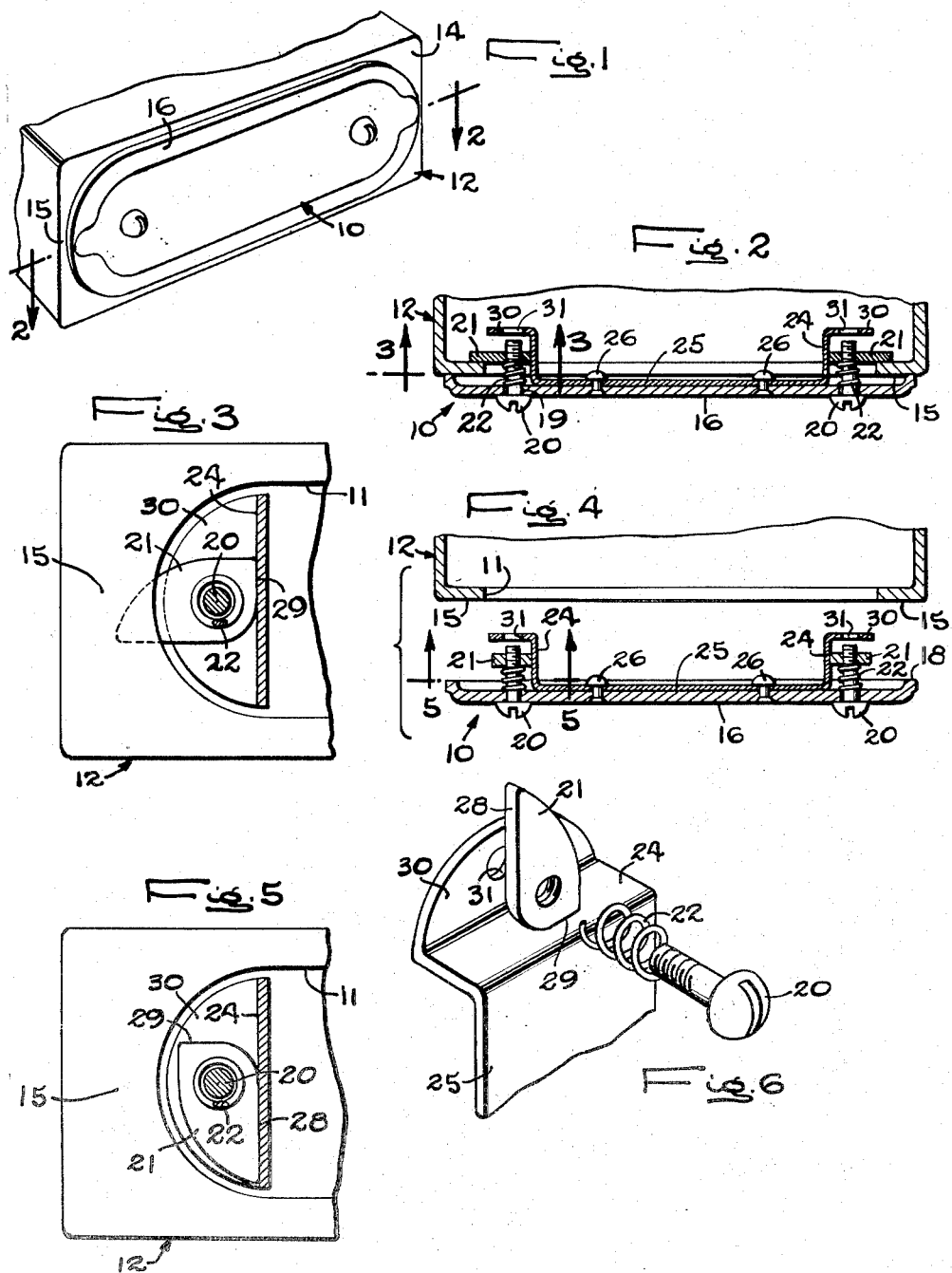
INVENTOR
Arthur I. Appleton
Carlson, Pitzner, Hubbard, & Wolfe
ATTORNEY Patented Oct. 2, 1951

2,569,914

UNITED STATES PATENT OFFICE 2,569,914

COVER CLAMP

Arthur I. Appleton, Chicago, Ill., assignor to Appleton Electric Company, Chicago, Ill., a company of Illinois Application August 6, 1948, Serial No. 42,987

1 Claim. (Cl. 220—25)

The present invention pertains generally to closure members for the access apertures of conduit fittings and the like. More particularly, the invention relates to a novel clamping arrangement for detachably securing such closure members in place.

One of the objects of the invention is to provide a simple closure member of the foregoing character which will be susceptible of secure installation within a remarkably short time and with a minimum of effort.

Another object is to provide a closure member of the type set forth and having an entirely self-contained clamping arrangement, eliminating the tedious, costly job of engaging various small loose parts.

A further object is to provide a clamping arrangement of the above type which will be simple, reliable and susceptible of economical manufacture.

Other objects and advantages will become apparent to those skilled in the art as the following detailed description proceeds, taken in connection with the accompanying drawings wherein:

Figure 1 is a fragmentary perspective view of a conduit fitting with an illustrative closure member embodying the invention secured in place thereon.

Fig. 2 is an enlarged fragmentary horizontal sectional view through the conduit fitting and closure member of Fig. 1, such view being taken in the plane of the line 2—2.

Fig. 3 is an enlarged fragmentary vertical sectional view taken through the device of Fig. 2 and in the plane of the line 3—3.

Fig. 4 is a view similar to Fig. 2 but with the closure member removed from the access opening of the conduit fitting and the clamping devices in a disengaged condition.

Fig. 5 is an enlarged fragmentary vertical sectional view through the closure member of Fig. 4 and taken in the plane of the line 5—5.

Fig. 6 is an enlarged fragmentary perspective view detailing the clamping elements of the closure member illustrated in the other figures, such elements being shown in exploded relation.

While the invention is susceptible of various modifications and alternative constructions, a perferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claim.

Upon further reference to the drawings, it will be perceived that the invention is there exemplified in an illustrative closure member 10 adapted in the present instance to cover the access opening 11 of a conduit fitting 12. In the particular fitting shown, the walls thereof are expanded into a rectangular box-like form having a flat outer face 14, through which the aperture 11 is cut to provide access to the interior for pulling cables, making connections, or otherwise working on the wiring contained therein. The opening 11 is, of course, made somewhat smaller than the face 14 so as to leave a relatively flat marginal edge portion 15 around the periphery of the opening 11.

The closure member 10, on the other hand, is organized upon an oblong cover plate 16 of appropriate size to overlie the marginal portion 15 surrounding the opening 11. To enhance the sealing action of the closure 10, the peripheral portion of the plate 16 may be laterally offset from the general plane of the same, thus defining a relatively narrow sealing surface 18. To further enhance the sealing action of the member 10 against moisture and weather, the plate 16 might be provided with a suitable sealing gasket (not shown) to be interposed between the surfaces 15 and 18.

Provision is made for detachably securing the closure member 10 in place over the opening in the fitting 12 by means of a self-contained clamping arrangement caried by either the member 10 or the fitting 12. In the present instance, the clamping arrangement is carried by the closure member 10 and includes a pair of clamping devices located adjacent the extremities of the cover plate 16 which serves as a sort of supporting wall for this purpose. Thus the plate 16, in the vicinity of each end, is formed with a hole 19 for receiving a suitable clamping screw 20, the diameter of the hole 19 being slightly larger than the diameter of the screw to permit free rotation of the latter therein. Operatively associated with each of the screws 20 and having a tapped hole for threadedly engaging the same is a clamping dog 21, preferably formed as a flat sheet metal stamping. Mounted in surrounding relation about each of the screws 20 and interposed between its corresponding locking dog 21 and the cover plate 16 is a helical spring 22. The latter by reason of its axial thrust serves to take up the backlash between the threads of each screw 20 and its locking dog 21, thereby yieldably connecting these parts together for common rotary movement. Such movement, as will readily be appreciated, is utilized in swinging the dogs 21 from a clamped to an unclamped position.

Means is provided for defining positively a range of angular movement for each of the clamping dogs 21 without placing corresponding limitations upon the angular movement of its clamping screw 20. One extremity of such range, of course, represents the clamped position of the dog 21 while the other limit represents its unclamped position. The above is accomplished by locating appropriate stop abutments 24 adjacent the screws 20 for arresting the motion of the clamping dogs 21 at predetermined points. In the present instance, the stop abutments 24 are made integral with a shallow, generally U-shaped stamping 25 which is rigidly secured to the cover plate 16 as by rivets 26 or other appropriate fastening means. To facilitate coaction with its adjacent stop abutment 24, each of the dogs 21 is fashioned with a pair of stop faces 28, 29 (Figs. 3, 5 and 6) disposed substantially at right angles to each other. When brought into contact with its abutment 24, the face 28, which is of somewhat greater length than the face 29, defines the unclamped position of dog 21. On the other hand, the clamped position of the dog 21 is reached when the face 29 is brought into contact with the abutment 24.

In operation, the closure member 10 is mounted in place on the fitting 12 by bringing the clamping arrangement on the under side of the former into registration with the access opening 11. The member 10 is then pushed toward the fitting 12 until the surface 18 seats upon the marginal portion 15 surrounding the opening 11. The member 10 can thereupon be clamped in this position simply by rotating each of the screws 20 clockwise (as viewed from the exterior of the plate 16), assuring that the screws 20 have right-hand threads. Due to the thrust of the helical springs 22, each of the dogs 21 will rotate with its respective screw 20, moving its stop face 28 away from the abutment 24 and at the same time bringing its stop face 29 toward the abutment 24. As soon as the face 29 makes contact with the abutment 24, the motion of the clamping dog 21 is arrested but the screw 20 is left free to override and continue its rotary motion. Under such conditions, further clockwise rotation of the screws 20 will produce tight gripping of the marginal edge portion 15 between the dogs 21 and the seating surface 18 of the closure member 10.

To release the clamping devices and remove the member 10 from the fitting 12, it is only necessary to follow a reverse procedure to that set forth above. Thus upon initial rotation of each of the screws 20 in a counter-clockwise direction, the grip between their respective dogs 21 and the portion 15 will be broken before the dogs start to turn. The yieldable clutching action of the springs 22 thereupon becomes effective to swing the dogs 21 counterclockwise with their clamping screws 20, such motion continuing until contact is again made between the stop faces 28 and their respective abutments 24. The closure member 10 can then be readily withdrawn from the opening 11.

Disengagement of the dogs 21, when once assembled upon their respective clamping screws 20, is effectively precluded by providing secondary stop abutments 30 overlying the ends of the screws and also the dogs 21. In the illustrative closure member 10, such secondary abutments are conveniently obtained by forming the stamping member 25 with out-turned end portions spaced from the ends of the screws 20 by an amount somewhat less than the thickness of the dogs 21. If desired, the abutments 30 may be provided with holes 31 of slightly greater diameter than the screws 20 and so located that the ends of the latter will project therethrough, thus making disengagement of the dogs from the screws an even more remote possibility.

The operation of the secondary abutments 30 will be appreciated upon consideration of what occurs when the clamping screws 20 are loosened. Thus as each such screw is loosened its dog 21 will move axially therealong and toward the associated abutment 30. With continued loosening of the screw 20 its dog 21 will be accosted by the abutment 30 before it can become disengaged from the screw, thus arresting further axial movement of the dog. Such action will inject additional frictional resistance to further loosening of the screw 20, at the same time causing the screw head to lift from the outer surface of the cover plate. Consequently, the user is apprised of the fact that the screw 20 is approaching the end of threaded engagement with the dog 21 and will become disengaged unless he stops loosening the screw.

I claim as my invention:

A closure member for the access opening of a conduit fitting and comprising, in combination, an oblong cover plate, a pair of clamping screws each mounted for free turning movement in said cover plate, a pair of clamping dogs carried by respective ones of said screws and mounted in threaded engagement thereon, helical springs interposed between respective ones of said dogs and said cover plate, each said spring being disposed in surrounding relation with a corresponding one of said screws, and a relatively shallow, substantially U-shaped sheet metal stamping rigidly fixed to the inner surface of said cover plate, said stamping having side portions each adapted to serve as a stop abutment for a respective one of said clamping dogs, said stamping also having out-turned end portions each extending into overlying relation with the end of a respective one of said clamping screws, each said out-turned end portion being normally spaced from the end of its associated screw by an amount less than the thickness of said dog to provide an indication of approaching disengagement between the screw and its dog.

ARTHUR I. APPLETON.

REFERENCES CITED

The following references are of record in the file of this patent:

UNITED STATES PATENTS

| Number | Name | Date |
| --- | --- | --- |
| 2,334,012 | Koch et al. | Nov. 9, 1943 |